(12) United States Patent
Van Der Net et al.

(10) Patent No.: US 12,091,575 B2
(45) Date of Patent: Sep. 17, 2024

(54) METHOD FOR PREPARING WATER-BASED AEROSOL PAINT COMPOSITION AND THE USAGE OF PAINT MATERIAL

(71) Applicant: WISESPRAY INTERNATIONAL OY, Veikkola (FI)

(72) Inventors: Hendrik Van Der Net, Scharnegoutum (NL); Ilkka Parviainen, Helsinki (FI)

(73) Assignee: WISESPRAY INTERNATIONAL OY, Veikkola (FI)

( * ) Notice: Subject to any disclaimer, the term of this patent is extended or adjusted under 35 U.S.C. 154(b) by 568 days.

(21) Appl. No.: 17/274,085

(22) PCT Filed: Sep. 6, 2019

(86) PCT No.: PCT/FI2019/050638
§ 371 (c)(1),
(2) Date: Mar. 5, 2021

(87) PCT Pub. No.: WO2020/049225
PCT Pub. Date: Mar. 12, 2020

(65) Prior Publication Data
US 2022/0081572 A1    Mar. 17, 2022

(30) Foreign Application Priority Data
Sep. 6, 2018 (EP) .................... 18192995

(51) Int. Cl.
*C09D 5/02* (2006.01)
*B65D 83/42* (2006.01)
*C09D 7/63* (2018.01)
*C09D 175/06* (2006.01)
*C09K 3/30* (2006.01)

(52) U.S. Cl.
CPC ............. *C09D 5/021* (2013.01); *B65D 83/42* (2013.01); *C09D 7/63* (2018.01); *C09D 175/06* (2013.01); *C09K 3/30* (2013.01)

(58) Field of Classification Search
CPC .......... B65D 83/42; C09D 5/021; C09D 7/63; C09D 175/06; C09K 3/30
See application file for complete search history.

(56) References Cited

U.S. PATENT DOCUMENTS

| | | | |
|---|---|---|---|
| 4,420,575 A | 12/1983 | Rapaport et al. | |
| 4,482,662 A | 11/1984 | Rapaport et al. | |
| 4,559,369 A | 12/1985 | Bauman et al. | |
| 2016/0002475 A1 | 1/2016 | Potthoff et al. | |

FOREIGN PATENT DOCUMENTS

| | | |
|---|---|---|
| WO | 2018162800 A1 | 9/2018 |
| WO | 2018162801 A1 | 9/2018 |

OTHER PUBLICATIONS

International Search Report for International Application No. PCT/FI2019/050638 dated Jan. 8, 2020.
Written Opinion for International Application No. PCT/FI2019/050638 dated Jan. 8, 2020.
International Preliminary Report on Patentability for International Application No. PCT/FI2019/050638 dated Jan. 26, 2021.
Carsten Wieczorrek: "Nanocolor PC Software for Spectrophotometers Version 4.0 Rev. 13", Macherey-Nagel Instructions for Colour Measurement Software ManualAddendum I:, Oct. 1, 2010 (Oct. 1, 2010), pp. 1-50.

*Primary Examiner* — Anthony J Green
(74) *Attorney, Agent, or Firm* — Meunier Carlin & Curfman LLC

(57) ABSTRACT

The invention relates to a method for testing a mutual combability of coating material and propellant and preparing a water based aerosol paint composition having a high concentration of coating material said method comprising: selecting at least one pair of polymeric resin and propellant, further selecting said selected propellant-polymeric resin-pair so that the propellant and the polymeric resin will pass the mutual combability test in a pressurized vessel in the presence of water-based solvent, providing into an aerosol can A) 50-85% w/w of coating material, and B) selected propellant 15-50% w/w; and sealing the can after or before adding ingredients in method stages A and B.

19 Claims, No Drawings

METHOD FOR PREPARING WATER-BASED AEROSOL PAINT COMPOSITION AND THE USAGE OF PAINT MATERIAL

CROSS-REFERENCE TO RELATED APPLICATIONS

This application is a national stage application filed under 35 U.S.C. § 371 of PCT/FI2018/050638 filed Sep. 6, 2019, which claims priority to and benefit of European patent application serial number 18192995.1 filed Sep. 6, 2018, the contents of which are incorporated herein by reference in their entirety.

The invention relates to method defined in claim 1 comprising testing a mutual combability of coating material and propellant and preparing a water-based aerosol paint having a high concentration of coating material.

The invention relates also to the usage of the paint material comprising water based solvent and at least one pair of polymeric resin and propellant as a paint composition in a water based aerosol paint sealed and pressurized in an aerosol can.

The majority of resins used for preparing water-based paints are incompatible with most common propellants, such as dimethyl ether, and therefore they have limited usage in preparing aerosol paints.

Some latex or styrene-butadiene based resins have been used more successfully in preparing water based aerosol paints even water based aerosol paints but the usefulness of latex paints is rather restricted when one needs a hard, glassy paint surface which stands also in higher temperatures. This kind of application is for example car painting. For durable car paint we need a surface that is hard (rigid, glassy state) and the coating film should remain in this rigid glassy state also by higher temperatures. Surface temperatures of the car in the sun (indoors and outdoors) can run up to 50-70° C. The hood of a black car can even become hotter in the full sun.

Latex or styrene-butadiene binders cannot usually be used for this kind application, because this requires that the binder have Tg (glass transition state) higher than least 50° C. and preferably even higher than 80-100° C. In the meantime, the MFT (minimum film forming temperature of the resin should be less than 20° C.

Dimethyl ether itself is a polar, water compatible solvent but also a very strong diluent, which will attack many common binders in a water-based solvent system and render them sticky, large molecules when storing time is extended. Therefore, the shelf lime and thus storage time of this kind of aerosol paints has been very limited if the concentration of binder is raised. To prevent this basic incompatibility of binders in DME containing water-based solvents it has been kept the binder concentration very low in aerosol paints. Low concentration of binder composition restricts considerably the amount of paint components (pigments, additives etc.) and the film to be formed may be of poor quality and low gloss.

Very few volatile organic compounds free aerosol paints are available at present. This is due to presence of propellant in the aerosol paint which will add a significant amount of volatile organic compounds into aerosol paint. Without propellant aerosol paint cannot be sprayed from an aerosol can. Other components used in aerosol paints (adjuvants, dispersion agents, binders, etc.) should be chosen so that they are selected from compounds which are VOC-free materials.

The above mentioned problems as a starting point the main objectives of the present invention were following: The first objective was to prepare a water-based aerosol paint having a high concentration of binder and which would preferable give a hard, elastic paint surface when sprayed onto target, such as the surface of the car.

The second objective was to exclude water-based aerosol paints which would give a hard, brittle or rubbish paint surface when used in temperatures about 40-80° C.

An additional objective was to prepare a water based aerosol paint with low VOC-values.

The above mentioned problems can be solved or at least alleviated by method defined in claim 1.

In the method mutual combability of coating material and propellant is tested and then prepared a water based aerosol paint having a high concentration of coating material. Said method comprises:

selecting at least one pair of polymeric resin and propellant, wherein polymeric resin is selected among the groups A1-A9:

A1) saponified/neutralized short oil alkyd which is in a water based solvent dilutable/emulsifiable and have less than 40% of fatty acids, A2) saponified/neutralized medium oil alkyd which is in a water based solvent dilutable/emulsifiable and have 40-60% of fatty acids, A3) short oil alkyd which is in a water based solvent emulsified/dispersed and have less than 40% of fatty acids, A4) medium oil alkyd which is in a water based solvent emulsified/dispersed and have 40-60% of fatty acids, A5) polyurethane modified alkyd being chained with mid oil, which in a water based solvent emulsified/dispersed and have 40-60% of fatty acids, A6) polyurethane modified alkyd chained with short oil having less than 40% of fatty acids and is in water based solvent emulsified/dispersed, A7) acrylic resin dispersible or emulsifiable in a water based solvent, A8) polyurethane modified acrylic resin dispersible or emulsifiable in a water based solvent, A9) polyurethane resin, and wherein the propellant is selected among the groups B1-B3

B1) dimethyl ether (DME),

B2) propane, butane, isobutene, and mixtures thereof,

B3); 2,2-dichloro-1,1,1-trifluotoethane;

further selecting said selected propellant-polymeric resin-pair so that the propellant and the polymeric resin will pass the mutual combability test and in a pressurized vessel in the presence of water-based solvent, in which mutual compatibility test the mutual compatibility of propellant and polymeric resin is tested for a group of concentration pairs of propellant and polymeric resin wherein each concentration pair comprises a member of polymeric resin having the first concentration, which member belong to group of polymeric resin test concentrations and a member of propellant concentrations having the second concentration and which belong to group of propellant test concentrations, wherein said polymeric resin group of concentrations consists of queue of polymeric concentrations which covers the test concentration range of polymeric resin, covering preferable concentration range from 25% w/w to 75% w/w and more preferable concentration range from 10% w/w to 90% w/w of polymeric resin and wherein said dimethyl ether group of test concentrations consists of queue of dimethyl ether concentrations which covers preferable concentration range from 25% w/w to 75% w/w and more preferable concentration range from 10% w/w to 90% w/w; and wherein for said group of concentration pairs of dimethyl ether and polymeric resin, the mutual compatibility is tested with test criteria which take into account at least following disturbances t1-t3 in paint material, formed paint film and spraying properties of the paint material out of the aerosol can:

t1) disturbances in paint film formation: low gloss and transparency, abnormal formation of particles inside the film, t2) disturbances in spraying pattern (obstruction of a valve of an aerosol can) of paint material when sprayed out of the aerosol can and in a case tests t1 and t2 have been passed:

t3 disturbances in gloss or transparency of paint material when stored an extended time period inside the aerosol can;

and after ensuring the mutual compatibility of the propellant and the polymeric resin in the above defined mutual compatibility test:

providing into an aerosol can

A) 50-85% w/w of coating material, consisting of nonvolatile content in the range of 17-60% w/w preferable in the range of 30-50% w/w and volatile content in the range of 40-83% w/w preferable in the range of 50-70% w/w, wherein said volatile content comprises water or mixture of water with a water compatible cosolvent and which nonvolatile content comprises selected and test criteria t1-t3 passed polymeric resin in the range of 35-90% w/w (dry weight) provided that the said polymeric resin make up at least 8% w/w (6% dry weight) from the said water based aerosol paint composition, color pigments, dispersing agents and possible fillers in the range of totally 0-30% w/w and additives up to 9% w/w and B) selected propellant 15-50% w/w;

sealing the can after or before adding ingredients in method stages A and B.

In the preferable method according to invention polymeric resin is selected among the groups A1-A6:

A1) saponified/neutralized short oil alkyd which is in a water based solvent dilutable/emulsifiable and have less than 40% of fatty acids, A2) saponified/neutralized medium oil alkyd which is in a water based solvent dilutable/emulsifiable and have 40-60% of fatty acids, A3) short oil alkyd which is in a water based solvent emulsified/dispersed and have less than 40% of fatty acids, A4) medium oil alkyd which is in a water based solvent emulsified/dispersed and have 40-60% of fatty acids, A5) polyurethane modified alkyd being chained with mid oil, which in a water based solvent emulsified/dispersed and have 40-60% of fatty acids, A6) polyurethane modified alkyd chained with short oil having less than 40% of fatty acids and is in water based solvent emulsified/dispersed.

Preferable propellant is dimethyl ether.

Non-flammable water based aerosol paint with a high dry weight and a lowered amount of volatile organic compounds (VOC) can also be prepared with the above mentioned method by selecting water-based solvent to be water. This kind of water based aerosol paint contains no co-solvent.

The use of the paint material comprises water based solvent and at least one pair of polymeric resin and propellant, wherein the polymeric resin is selected from among the groups A1-A9:

A1) saponified/neutralized short oil alkyd which is in a water based solvent dilutable/emulsifiable and have less than 40% of fatty acids, A2) saponified/neutralized medium oil alkyd which is in a water based solvent dilutable/emulsifiable and have 40-60% of fatty acids, A3) short oil alkyd which is in a water based solvent emulsified/dispersed and have less than 40% of fatty acids, A4) medium oil alkyd which is in a water based solvent emulsified/dispersed and have 40-60% of fatty acids, A5) polyurethane modified alkyd being chained with mid oil, which in a water based solvent emulsified/dispersed and have 40-60% of fatty acids, A6) polyurethane modified alkyd chained with short oil having less than 40% of fatty acids and is in water based solvent emulsified/dispersed, A7) acrylic resin dispersible or emulsifiable in a water based solvent, A8) polyurethane modified acrylic resin dispersible or emulsifiable in a water based solvent, A9) polyurethane resin, and wherein the propellant is dimethyl ether (DME); and wherein said selected pair of the propellant and polymeric resin is further selected so, that it will pass the mutual combability test in a pressurized vessel in the presence of water based solvent, in which mutual combability test mutual compatibility is tested for a group of concentration pairs wherein each concentration pair comprises a member of polymeric resin group of concentrations having the first concentration and a member of dimethyl ether group of concentrations having the second concentration, wherein said polymeric resin group of concentrations consists of queue of polymeric concentrations which covers the test concentration range of polymeric resin, covering preferable concentration range from 25% w/w to 75% w/w and more preferable concentration range from 10% w/w to 90% w/w, and wherein said dimethyl ether group of concentrations consists of queue of dimethyl ether concentrations which covers the test concentration range of dimethyl ether covering preferable concentration range from 25% w/w to 75% w/w and more preferable concentration range from 10% w/w to 90%; and wherein each pair of concentrations with first concentration of polymeric resin and the second concentration of dimethyl ether is tested within test concentration range with test criteria which take into account at least following disturbances:

disturbances in film forming properties of the aerosol paint composition sprayed out from aerosol can to the target site, disturbances in drying time of formed paint film, disturbances in color or transparency of aerosol paint composition when stored an extended time period in an aerosol can, disturbances in spraying properties of the aerosol paint composition; and wherein said paint material comprises:
dimethyl ether (DME) in the range of 10-50% w/w,
selected polymeric resin(s) in the range of 10-60%, w/w;
water based solvent in the range of 4-60%, w/w;
as a paint composition in a water based aerosol paint sealed and pressurized in an aerosol can.

Non-flammable water based aerosol paint with a high dry weight and a lowered amount of volatile organic compounds (VOC) can also be prepared by using above mentioned paint material. Said paint material then comprises:
- up to 24% w/w of propellant which is dimethyl ether (DME);
- B) up to 76% w/w of coating material, consisting non-volatile content in the range of 65-95% w/w and volatile content in the range of 5-35% w/w;
- which volatile content contains water up to 0-100% w/w and additives, cosolvents and dispersing agents which comprise altogether of 0-9% w/w of volatile liquids, having 0-10% w/w preferable less than 5% w/w of volatile organic compounds (VOC)
- provided that the aggregate amount of dimethyl ether (DME) and the volatile organic compounds (VOC) in volatile liquids is such that VOC concentration is below 186 g/l (responding about 24% w/w, calculated as DME)
- and
- which nonvolatile content comprises color pigments and possible fillers in the range of 0-30% w/w, polymeric resin in the range of 25-99% w/w preferably in the range of 35-90% w/w and additives up to 9% w/w, which polymeric resin is present as an emulsified dispersion in water miscible solvent comprising water and dimethyl ether (DME).

Non-flammable water based aerosol paint composition comprises dimethyl ether (DME) up to 24% w/w, polyurethane modified alkyd resin or alkyd resin in the range of 30-65% w/w, additives and dispersing agents in the range of 0-2% w/w, color pigments, fillers and mattening agents in the range of 0-20% w/w the rest being water.

Non-flammable water based aerosol paint composition consisting of dimethyl ether (DME) up to 24% w/w, polyurethane modified alkyd resin or alkyd resin in the range of 30-65% w/w, additives and dispersing agents in the range of 0-2% w/w and the rest being water.

Non-flammable water based aerosol paint composition wherein the dry weight is in the range of 40-45% of the nonvolatile content and 30-37% preferable 32-35% w/w from the total weight of the aerosol paint composition.

The invention relates also to use of paint material as a paint composition in a water-based aerosol paint. In this case the aerosol paint composition is flammable one it comprises:
dimethyl ether (propellant) 25-50% w/w,
50-85% w/w of coating material, consisting of nonvolatile content in the range of 17-60% w/w preferable in the range of 30-50% w/w and volatile content in the range of 40-83% w/w preferable in the range of 50-70% w/w, wherein
said volatile content comprises water or mixture of water and water compatible solvent and
said nonvolatile content comprises selected polymeric resin in the range of 17-60% w/w (dry weight) provided that the said polymeric resin makes up at least 8% w/w (dry weight) from the said water-based aerosol paint composition,
color pigments, dispersing agents and possible fillers in the range of totally 0-30% w/w and additives up to 9% w/w.

Polyurethane modified alkyd resin or alkyd resin means herein an alkyd oil resin or a polyurethane alkyd oil resin, which have an oil content.

Co-solvent means herein a water compatible liquid which is capable of dissolving binder polymer (film forming polymer) with the water.

Suitable water compatible co-solvents are: lower alcohols, glycol ethers, alkyl ethers of ethylene glycol or propylene glycol.

Volatile agent means herein an agent which will escape partially or totally from coalescing paint film. Volatile agent is usually also volatile organic compound.

Volatile organic compound (VOC) means herein an organic compound, which has the boiling point under 250° C. at a standard pressure of 101.3 kPa and have vapor pressure of 0.01 kPa or more at ordinary room temperature (20° C.).

Non-flammable aerosol is herein an aerosol which is non-flammable according to European directive 2008/47/EY, in regard to points 6.3.1 and 6.3.2.

The present invention is a based on two main ideas. The first idea is to identify good binder candidates which are compatible with the some of the main propellants, used in aerosol paints. These propellants comprise especially dimethyl ether. Test criteria should take account following disturbances, which may lead to inferior film forming properties, inferior spraying patterns and shortened shelf life of aerosol paint:
Defects in film forming properties of paint material sprayed out from the aerosol can onto the target site, measured as a gloss under 80, defined according to ISO 2813, and as a transparency over 5, when defined as an iodine value,
Disturbances in gloss or transparency of aerosol paint composition when stored an extended time period in an aerosol can, measured as a gloss under 80 defined according to ISO 2813, and as a transparency over 5, when defined as an iodine value,
disturbances in spraying properties of the aerosol paint composition detected as a valve jamming due to paint material particles.

In the inventive method of the present invention it is used above mentioned identification methodology, which takes account of these main disturbances for finding potential candidates for good binders which can be used with propellants, especially DME.

However, although this kind of test method is effective and takes account the main properties of aerosol paint, which will affect to film forming and the quality of the paint surface, it may be cumbersome to find proper candidates among the many possible binders.

For this reason, the inventors have further identified several group of suitable binder candidates, which will serve as good starting point for identifying binders, which are compatible with the propellants used in aerosol paints.

Thus, second inventive idea is based on the fact idea that alkyd emulsions and polyurethane modified alkyd emulsions are made hardly without emulsifiers and/or surfactants. Mostly by leading steam in the liquid phase (alkyd liquid polymer+emulsifier or alkyd-pu liquid polymer+emulsifier) is already enough.

The hydrophobic part of the emulsifier feels perfectly at home in the "oily" that is fatty acid part of an oil modified alkyd resin or oil modified polyurethane alkyd molecule and the influence of the dimethyl ether (DME) on the hydrophilic part of the emulsifier can be neglected.

This leads to a stable mixture in the aerosol can that can be sprayed easily without blocking valve systems of the aerosol can. The wet film has the ability to flow and form a film without the need of co-solvents.

Preferable alkyd resin (or polyurethane modified) alkyd resin contains less than 40% w/w of fatty acids (short oil alkyd resin) or 40-60% w/w of fatty acids thus being medium long oil alkyd resin (or polyurethane modified alkyd resin).

Besides short oil alkyd resins, there are two more types of alkyd resins: long oil alkyd resins and medium oil alkyd resins.

Long oil alkyd resin contains more than 60% fatty acids by weight.

Medium oil alkyd resin contains 40% to 60% fatty acids by weight.

Short oil alkyd resin contains less than 40% fatty acids by weight.

Structure:

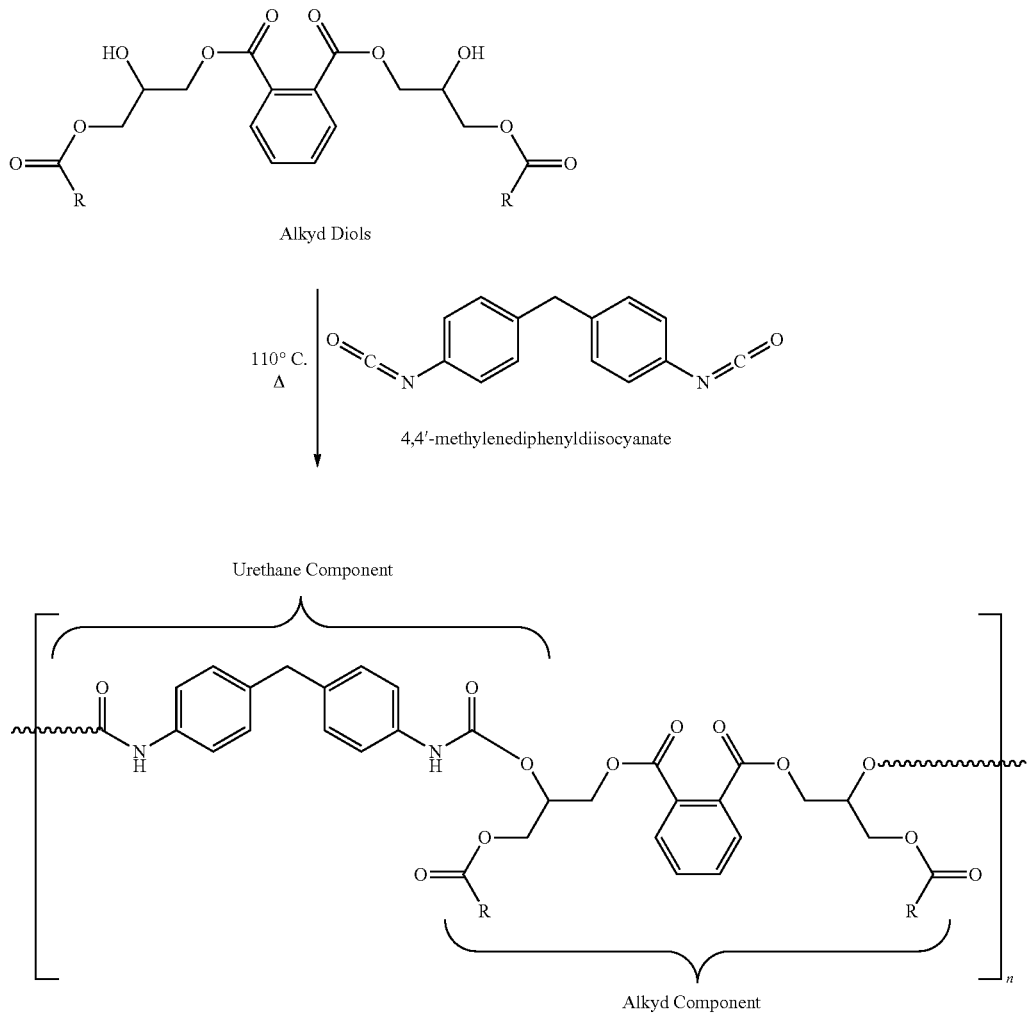

A short oil alkyd resin is an alkyd binder made with a short oil to alkyd resin ratio. The percentage of fatty acids in the short oil alkyd resins is less than 40 percent. These fatty acids act as the modifying agents in the resins. The short oil alkyd resins are generally oven dried because they cannot be air dried. Typical solvent systems for these products are the aliphatic solvents. Some may be cut in aromatics or oxygenated solvents for high solids. Most will accept infinite dilution with aliphatic solvents. In the case of short oil alkyds, these resins are generally oven dried and have a limited solubility only with aromatic and other non-aliphatic solvents.

This structure of alkyd oil resin or alkyd polyurethane oil resin is flexible and will not be attacked by the presence of dimethyl ether (DME). In principle are all components compatible.

This kind of polymer does do not need any co-solvent to form a film for the emulsified particles flow by themselves when the liquid phase will evaporate.

Contrary to this due to the hard acrylic shell the particles of acrylics and acryl/alkyd-emulsions are not so sensitive to emulsifiers (difficult to penetrate for the hydrophobic part of the emulsifier). This is the reason why they are dispersed in water instead of emulsified with the help of surfactants.

If these dispersions are used in an aerosol where the propellant is dimethyl ether, which is a strong solvent when present in an aerosol can 25-40% w/w, dimethyl ether will attack the hard acrylic shell and will (partly) dissolve or plasticize the shell. This will lead to a disturbance in acrylic or acryl/alkyd-emulsions because sticky, half dissolved binder parts will form (much bigger than the initial dispersion) that will block the valve system of an aerosol can. Co-solvent will tackify/partly dissolve the acrylic shell and will form a film.

Preferable alkyd oil or alkyd urethane oil resin is selected from resins of class A1)-A6), which can be used for promoting water-based aerosol paints having high binder concentration:

A1) saponified/neutralized short oil alkyd which is water dilutable/emulsifiable having less than 40% of fatty acids, A2) saponified/neutralized medium oil alkyd which is water dilutable/emulsifiable having 40-60% of fatty acids, A3) emulsified/dispersed short oil alkyd having less than 40% of fatty acids, A4) emulsified/dispersed medium oil alkyd having 40-60% of fatty acids, A5) emulsified/dispersed polyurethane modified alkyd being chained with mid oil having 40-60% of fatty acids A6) emulsified/dispersed polyurethane modified alkyd being chained with short oil having less than 40% of fatty acids Exemplary Binders of Class A1 to A6

In the presents invention aerosol paint compositions are based preferable on alkyd oil resins or polyurethane alkyd resins of broader classes A1)-A6), which can be used for promoting water-based aerosol paints having high binder concentration. In table 1 are given exemplary binders in each of the above mentioned broader classes A1) to A6).

From binders one can choose VOC-free and low VOC alternate. VOC-values are given in supplier's product datasheets or safety datasheets. Below are exemplary binders with VOC-values given in supplier's safety and product datasheets.

TABLE 1

| exemplary binders to previously above mentioned broader classes a-f |
| --- |
| Necowel 4300 |
| Synaqua 4804 |
| Synthalat PWM 883 S |
| Worleesol E330W |
| Worleesol E927W |
| Necowel 586 N |
| DOMALKYD 0545 40 Wa |
| WorleeSol NW 410 (class b) |
| Crosscore 5000 |

Synaqua 4804
APEO an ammonia and solvent free short-oil alkyd emulsion (class A1)

Necowel 4300 is a co-solvent free, cationic modified medium-oil alkyd neutralized with ammonia to make it water emulsifiable (class b).

Synthalat PWM 883 S
Solvent and surfactant free medium oil urethane alkyd emulsion (class A5)

Necowel 586 N
Cosolvent free, modified alkyd emulsion medium oil length (class A2)

Worleesol E330W
A solvent free short-oil modified polyurethane alkyd emulsion (class A6)

Worleesol E927W
A solvent free short-oil modified polyurethane alkyd emulsion (class A6)

DOMALKYD 0545 40 Wa (class A4)
An anionic emulsion of polyurethane resin,

Properties of Above Mentioned Binders:

NECOWEL 586 N
Co-solvent free, modified alkyd emulsion medium oil length (class A2)

NECOWEL 586 N is an aromatic PU-modified alkyd emulsion with medium oil length.

The emulsion does not contain APEO and is free of VOC and SVOC

Analytical data •
Solid content: 47-50%•
Oil length: approx. 50%•
Type of oil: soybean oil•
Viscosity: 2.0-3.5 Pas, 20° C.•
pH-value: 7-8••
Solvent: water DOMALKYD 0545 40 Wa (Class A4)
CHARACTERISTICS
Domalkyd 0545 40 Wa is anionic emulsion of polyurethane resin, modified with vegetable fatty acids. Supplied as 40% in water.

PHYSICAL CHARACTERISTICS:

| | |
| --- | --- |
| Non-volatile content 40 ± 1% DIN EN ISO 3251 | |
| Oil content | approx. 44% |
| Hydroxyl content (resin solid) DIN ISO 4629 | approx. 1% |
| Viscosity (100 1/s, 23° C.) DIN EN ISO 3219 | 50-500 mPas |
| pH DIN 19268 | 7-8 |
| Density approx. ISO 2811 | 1.02 g/cm$^3$ |

SPECIAL PROPERTIES: Rapid air drying, high gloss and excellent flow. Outstanding adhesion and elasticity. High hardness, good water and chemical resistance.

APPLICATIONS: Domalkyd 0545 40 Wa is used for yellowing-resistant top coats and one-coat paints for industrial application (air and forced drying and stowing systems) on wood, steel and aluminium with excellent gloss retention and elasticity. Domalkyd 0545 40 Wa contains no emulsifiers and may be thinned with water at all ratios. Coating systems based on Domalkyd 0545 40 Wa exhibit very rapid physical drying. However, it is advisable to use some water based dryer. The siccative should be added carefully during agitation. Domalkyd 0545 40 Wa can be blended with water reducible melamine resin. Baking conditions depends on reactivity of melamine resin (max. 140° C.).

Synaqua 4804 (class A3)
Synaqua is a short oil alkyd emulsion. APEO and ammonia free, low VOC alternative available (below 50 g/l).

| | |
| --- | --- |
| Total solids | 50 ± 1% w/w |
| Viscosity | 300 Cps |
| Density | 9.9 |
| pH | 7.0 |
| Solvent: | water |

WorleeSol NW 410

This is a solvent free medium oil special modified alkyd emulsion (class A4).

Appearance milky liquid delivery form 46% in water

| Non-volatile content | 46% ± 2 |
| --- | --- |
| Oil content (1 h/125° C.), Defined: DIN EN ISO 3251 | approx. 40%. |
| Viscosity, 20° C. defined: Brookfield, spindle 4/20 rpm, DIN EN ISO 2555 | max. 3,000 mPas |
| Density in 23° C. Defined: DIN EN ISO 2811-1. | 1.050 g/cm$^3$ |

WorleeSol NW 410 resin can be used for the manufacturing of water dilutable decorative and d.i.y. paints, which especially show good brushability, excellent levelling and good filling properties. It is especially recommended for high gloss top coats. The formulation of wood protection stains is also possible.

Necowel 4300

Cationic modified medium-oil alkyd neutralized with ammonia co-solvent free, to make it water emulsifiable (class A2).

| Solid content | 41-45% |
| --- | --- |
| Oil length | approx. 35% |
| Viscocity (25° C.) | 50-150 mPas |
| pH | 5.5-6.5 |
| Solvent: | water |

Crosscore 5000

A medium oil alkyd emulsion at 50% solids (class A4).

Properties:

Medium to short oil alkyd emulsion Oil length 40%

Appearance milky white Solids 50%

Contains oil type soybean fatty acid co-solvent free and Amine free

Particle size±200 nm

Viscosity 20 mPas at 23° C. pH±7.

This resin is an example of resins of broader class d)

Additional properties: alkyd emulsion which is VOC free and don't need co-solvents to dry. There is no further VOC release after through drying and hardening.

Use: Interior and exterior primers and topcoats for wood, metal and joinery application, Corrosion resistant primers.

Worleesol E330W

Short oil modified PU alkyd emulsion, water dilutable (class A6)

| Non-volatile content defined: DIN EN ISO 3251 | 42 ± 2 |
| --- | --- |
| Oil content about | 33% |
| Viscosity defined DIN EN ISO 2555 | max 10,000 mPas |
| Acid value, on solids defined DIN EN ISO 2555 | 15-20 |
| pH | 7.5-8.5 |
| Density 20 C. defined DIN EN ISI 2811-1 | 1.046 g/cm$^3$ |
| Delivery: 42% in water, VOC free. | |

Worleesol E927W

Short oil PU alkyd emulsion (class A6), for water-borne solvent systems

Good compatibility with acrylic dispersions

| Non-volatile content Defined: DIN EN ISO 3251 | 40% ± 2 |
| --- | --- |
| Oil content | approx. 27% |
| Density, 20° C., Defined: DIN EN ISO 2811-1 | approx. 1.04 g/cm$^3$ |
| Acid value, on solids, Defined: DIN EN ISO 3682 | max. 30 |
| pH-value Defined: DIN ISO 976 | 6.8-7.5 |
| Viscosity (20° C.), Defined: DIN EN ISO 2555 Appearance milky liquid | max. 10.000 mPas |

Synthalat PWM 883 S

Solvent and surfactant free, urethane alkyd emulsion based on medium oil resin, with xylene below 0.1%

| Oil content Special drying fatty acid | approx. 45% |
| --- | --- |
| Supplied 45% in water viscosity in mPas (in-house method AV-F-V005) | 200-700 (as supplied) |
| non-volatile content (in-house method AV-F-F003) | 45 ± 2% (as supplied) |
| pH-value (as supplied) (in-house method AV-F-P001) | 7.0-9.0 |
| acid value (house method AV-F-S001) o | in mg KOH/g <30 |
| Organic solvents | acetone <0.3% |

Synthalat PWM 883/45% is suitable as sole binder for fast drying water based industrial lacquers with reduced amount of dryers.

Additives

In a case of non-flammable aerosol paints additives can be either VOC-free or having low VOC-content. The VOC-values for any additive can be easily taken from supplier's product catalogues and safety datasheets. If there is any volatile organic compound in a specified additive, it must be mentioned in the safety datasheet for this additive.

Below have been given some non-restrictive guidelines for choosing VOC-free and low-VOC additives for non-flammable aerosol paint compositions.

Wetting and dispersing additives for waterborne application use electrosteric stabilization. The amount of added dispersing depends mainly on the pigment quality being usually on the very broad range of 6-90% calculated from the amount of the pigment.

Some exemplary VOC-free wetting and dispersing additives for water-borne paints:

Byk 191, which is a solution of a copolymer with pigment-affinic groups in water. The additive deflocculates pigments by means of steric stabilization.

TEGO® Dispers 653, which is a pigment-wetting and dispersing additive. This additive has modified polyether with groups of high pigment affinity.

Defoaming agents. To prevent foam and destroy any foam present, defoamers have to be added to the formulation. Most defoamers are also effective to some degree as deaerators and the reverse is true. A defoamer must be insoluble in the formulation to be defoamed where it should be present in the form of finely divided droplets. Furthermore, it is necessary for it to be sufficiently compatible with the medium to be defoamed not to cause surface defects such as craters.

Most used defoaming agents are polydimethylsiloxanes and modified polysiloxanes.

Some examples of VOC-free defoamers/deaerators:

Tego Airex 902W. Emulsion of a polyether siloxane copolymer, contains fumed silica. Non-volatile content approx. 24%. Addition level calculated on total formulation: 0.2-3.0%.

Tego Foamex 840. Polyether siloxane copolymer, silica-free. Technical information—appearance clear liquid—active matter content 100% Addition level calculated on total formulation: 0.05-0.5%. Addition may be either in the grind or during the let-down procedure.

Byk 1617. Emulsion of foam-destroying polysiloxanes, hydrophobic solids and emulsifying agents. Density (20° C.): 1.00 g/ml Non-volatile matter (60 min, 105° C.): 12.5%. Carrier: Water Viscosity modifiers. In water borne formulations, the binder is in the form of dispersed polymer particles so that regulation of the flow behavior by changing the molecular weight is not possible. Rheological additives (thickeners) must therefore be used to adjust the flow properties of waterborne coatings and printing inks.

Rheological additives can be roughly separated into inorganic and organic thickeners or thickeners for solvent borne or waterborne coatings.

Below are examples of modified inorganic thickeners for solvent borne and waterborne systems. This list is not intended to be comprehensive.

Water-borne and solvent-borne systems: Bentonite, synthetic lattice-layer silicate, pyrogenic silica (sometimes organically modified).

Examples of organic thickeners for waterborne and solvent borne systems include: polyureas, cellulose derivatives, polyamides. Examples of organic thickeners for waterborne coatings include: associative thickeners, non-associative thickeners.

Adhesion promoters (AP) are bi-functional materials that increase adhesive strength between the coating and the substrate and sometimes are referred to as coupling agents.

Titanates and zirconates are coupling agents and adhesion promoters that increase impact strength and chemical resistance and enhance physical, com-pounding and application properties.

Monomeric phosphate chemistries and phosphate-esters are materials used in free-radical emulsion polymerization and provide wet adhesion bonding to the substrate.

Oligomeric Silanes. The first-generation coupling agents that are still used to improve adhesion are mono-functional. These mono-functional silane adhesion promoters are more and more substituted by oligomers. The oligomer molecules have a moderately high molecular weight and multiple functionality in both types of reactive groups: Methoxy (—O—CH3) groups, directly linked to silicon (Si) atoms, which form a covalent bond with the hydroxyl (—OH) groups of the metal substrate. Epoxy groups that co-crosslink with the binder system during film formation. The core of the additive is formed by a strong siloxane network that has excellent resistance against, for example, hydrolysis, chemicals and UV radiation. Despite the increased molecular weight, compared to mono-functional silanes, the oligomer has a low viscosity and a broad compatibility.

EXAMPLES FROM COMPOSITIONS

Paint Compositions for Aerosol Cans

Following compositions were prepared into an aerosol can by filling an aerosol can with the coating material then closing the can. The closed can was filled with liquefied propellant dimethyl ether (DME). The filling volume of the can was either 400 ml or 675 ml. In any of the given examples can be used all binders given in table 1.

Polymeric resins used in examples contain water and their dry matter content was usually 6-30%. In brackets is given the proportion of dry resin.

Example 1

High gloss top coat

| Ingredients | % w/w |
| --- | --- |
| Necowell 4300 | 60.00 (25.8) |
| Dispersing aid | 0.40 |
| Drier | 0.06 |
| Defoamer | 0.30 |
| color pastes | 10.00 |
| Thickener | 0.25 |
| Aerosil 200 (SiO2 fumed) | 0.50 |
| Water | 6.49 |
| Dimethyl ether | 22.00 |
| Total | 100.00 (34) |

Instead of Necowell 4300 also other binders mentioned in table 1 can be used.

Example 2

Anti Rust primer

| Ingredient | % w/w |
| --- | --- |
| Synaqua 4804 | 53.40 (26.7) |
| Dispersing aid | 0.60 |
| Defoamer | 0.30 |
| Iron Oxyde RED paste | 8.00 |
| Calcium modified silica gel | 5.00 |
| Bentonite | 0.60 |
| thickener | 0.16 |
| Water | 3.50 |
| dimethyl ether | 27.00 |
| Total | 100.00 (39) |

Instead of Synaqua 4804 also other binders mentioned in table 1 can be used.

Example 3

Clear top coat

| Ingredient | % w/w |
| --- | --- |
| Worleesol E330W | 57.00 (24) |
| Defoamer | 0.30 |
| Thickener | 0.35 |
| Flow/slip additive | 0.10 |
| Flow/slip additive | 20.25 |
| Dimethyl ether | 22.00 |
| Total | 100.00 (24) |

| Ingredient | % w/w |
|---|---|
| Worleesol E927W | 25.00 (10) |
| Domalkyd 0545 40 Wa or Necowel 586 N | 30.00 (12) |
| dispersing agent | 0.25 |
| defoamer | 0.20 |
| flow/slip additive | 0.18 |
| thickner (newtonian) | 0.10 |
| thickner (tixothrope) | 0.16 |
| mix of collar paste's | 10.00 |
| Water | 11.11 |
| Dimethyl ether | 23.00 |
| Total | 100.00 (30) |

Instead of Worleesol E927W and Domalkyd 0545 40 Wa or Necowel 586 N also other binders mentioned in table 1 can be used.

Example 5

A typical water-based aerosol base paint of the invention comprises polyurethane-modified resin 80-100 g (binder), water 100-150 g, various additives 2-11 g and dimethyl ether (DME) 75-95 g, packed for example in an aerosol bottle having a filling volume of 400 ml.

One typical ready-to-use aerosol base paint of the invention, present in a pressurized aerosol bottle with a filling volume of 400 ml, was prepared as follows:
the polyurethane-modified resin and additives were dispensed into an aerosol bottle;
the propellant (DME) was added into the aerosol bottle and the bottle was sealed to become airtight.

Thus, the pressurized aerosol bottle having a filling volume of 400 ml contained the following aerosol base paint components in liquid phase:

| Ingredient | amount/g | amount/w-% |
|---|---|---|
| Polyurethane-modified alkyd resin | 92.7 | 30.1 (12.6) |
| Flow promoter (Capston) | 0.8 | 0.2 |
| Pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 121.5 | 39.5 |
| DME (dimethyl ether) | 83.6 | 27.2 |
| Total | 307.0 | 100.0 (14) |

The density of this aerosol base paint was about 1 g/cm$^3$, whereby the volume occupied by the liquid phase of the aerosol bottle's filling volume (400 ml) was about 300 ml.

Such an aerosol base paint is combustible as such, but have a high binder content (about 30% by weight) and relatively low amount of dimethyl ether, DME (27% by weight) and can be used for preparing also non-flammable aerosol paint compositions.

This aerosol base paint is compatible with most of the commercial toning equipment for water-based paints, i.e. it can have a pigment (coloring paste) dispensed therein in a mechanized manner with dispensing devices having a dosing accuracy of 0.1-0.2 ml.

This aerosol base paint makes it possible to provide a paint coating with any desired gloss level (matte, semi-gloss, glossy) One and the same aerosol base paint lends itself to being toned for a precisely desired tint for example with the RAL color matching system (168 color tones) or with the NCS color tone system (1668 color tones).

Instead of polyurethane-modified alkyd, it is also possible to use alkyd, epoxy-modified alkyd, and some styrene-butadiene emulsions/dispersions (latexes) having low transition glass temperature.

Example 6

A base paint for preparing a non-flammable paint into an aerosol can;
First aerosol base paint modified in terms of the amount of alkyd resin

| Ingredient | amount/g | amount/w-% |
|---|---|---|
| Polyurethane-modified alkyd resin | 67.7 | 22.0 (10) |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 146.5 | 47.6 |
| DME | 83.6 | 27.2 |
| Total | 307.0 | 100.0 (11.73) |

In the aerosol base paint of example 1, having been packed into an aerosol bottle with a filling volume of 400 ml, the amount of alkyd resin was modified according to which components were added from a filling cup of 100 ml into the aerosol base paint present in the aerosol bottle. The filling cup was again functionally in communication with a toning and dispensing device whose minimum dosing amount was 0.1 ml of coloring paste.

The first aerosol base paint, which was modified in terms of the amount of alkyd resin, had been modified in such a way that it could be supplemented from the filling cup of a toning and dispensing device with a coloring paste in the amount of 1-35 ml corresponding to each color tone recipe, as well as with a binder and water 50 ml in total (50% by volume of water, 50% by volume of polyurethane-modified alkyd resin). Thereby is obtained an aerosol paint toned to readiness, the space occupied thereby being 350-400 ml of the aerosol bottle with a filling volume of 400 ml.

Example 7

Second aerosol base paint modified in terms of the amount of alkyd resin:

| Component | amount/g | amount % w/w |
|---|---|---|
| Polyurethane-modified alkyd resin | 42.7 | 13.9 (6.95) |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 171.5 | 55.8 (8.78) |
| DME | 83.6 | 27.2 |
| Total | 307.0 | 100.0 |

In the second modified aerosol base paint, the amount of alkyd resin in the aerosol base paint of example 1 had been changed in such a way that it could be supplemented from a filling cup of the toning and dispensing device with a coloring paste in the amount of 1-35 ml corresponding to each color tone recipe, and with 50 ml of water. Thereby is obtained an aerosol paint toned to readiness, the space occupied thereby being 350-400 ml of the aerosol bottle with a filling volume of 400 ml.

Examples 8A and 8B

Example 8A

The aerosol base paint of example 5 was modified to get a white base paint and it was packed into an aerosol can with a filling volume of 400 ml and then toned in a mechanized manner with a commercial dispensing machine (see FIG. 1) whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol can

| | |
|---|---|
| White base paint | 247 g (185 ml) |
| DME (dimethyl ether) | 73 g (110 ml) |

Part B: Filling Cup, Added to Aerosol can of Part A

| | |
|---|---|
| Domalkyd 0545 40 Wa or Necowel 586 N (binder) (40% w/w emulsion in water) | 40 g |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N) | 31% w/w |
| Water | 10% w/w |
| DME | 19% w/w |
| $TiO_2$ | 25% w/w |
| Other pigments | 5-12% w/w |
| Additives | 5-12% w/w, |
| wherein each of the additive is added | 0.1-1.5% w/w |

White Base Paint Composition and its Volatile Organic Compounds
Polyurethane Modified Alkyd Emulsion Domalkyd 0545 40 Wa or Necowel 586 N 40% w/w in water, VOC Free
Siccatief 0.22% w/w
Drier
Dextrol OC-180
dispersing agent)
$TiO_2$
Capstone SF 65
surface tension modifier, VOC free -continued BYk 349
surface tension modifier
Rheolate 310
rheology modifier, VOC free
Diosperbyk 199
Wetting and dispersive agent, Voc free, pigment stabilizer
AMP
pH modifier
Water (demineralized)
Acemat Ok 520
solid matting agent As can be seen above none of the additives, binder or pigments contains any volatile organic compounds (VOC). The only VOC-source was DME having weight of 19% w/w of the total weight of the readymade aerosol paint in the can (400 ml). The VOC-content of this aerosol paint is 19% and it was non-flammable in a subsequent test.

Example 8B

The aerosol base paint of example 1 was modified to get a clear base paint and it was packed into an aerosol can with a filling volume of 400 ml and then toned in a mechanized manner with a commercial dispensing machine (see FIG. 1) whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol can

| | |
|---|---|
| Binder mix clear | 185 g (185 ml) |
| DME (dimethyl ether) | 73 g (110 ml) |

Part B: Fillinq Cup. Added to Aerosol can of Part A

| | |
|---|---|
| Domalkyd 0545 40 Wa or Necowel 586 N (binder) (40% w/w emulsion in water) | 40 g |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N) | 48% w/w |
| Water | 6% w/w |
| DME | 21% w/w |
| Pigments | 7-15% w/w |
| Additives | 5-10% w/w, |
| wherein each of the additive is added | 0.1-1.5% w/w |

Clear Binder Mix Base Paint Composition and its Volatile Organic Compounds
Polyurethane Modified Alkyd Emulsion Domalkyd 0545 40 Wa or Necowel 586 N 40% w/w in water, VOC Free
Borchi oxy coat, Voc free -continued Drier
Dextrol OC-180
dispersing agent)
TiO$_2$
Capstone SF 65
surface tension modifier, VOC free
BYk 349
surface tension modifier
Rheolate 310
rheology modifier, VOC free
Diosperbyk 199
Wetting and dispersive agent, Voc free, pigment stabilizer
AMP
pH modifier
Water (demineralized)

As can be seen from above, none of the additives, binders or pigments contain any volatile organic compounds (VOC). The only VOC-source was DME having weight of 19% w/w of the total weight of the readymade aerosol paint composition in the can (400 ml). The VOC-content of this aerosol paint is 21% w/w and the paint was non-flammable in a subsequent test.

In examples 9-11 have been presented some exemplary, non-restricting examples of aerosol paint which may be flammable in a relevant test. Again, in the brackets have been presented dry weight percents for some main components of the aerosol paint composition.

Example 9

| Ingredients | % w/w |
|---|---|
| Necowell 4300 | 42.00 (18.06) |
| Dispersing aid | 0.28 |
| Drier | 0.04 |
| Defoamer | 0.21 |
| color pastes | 7.00 (4.9) |
| Thickener | 0.18 |
| Aerosil 200 (SiO2 fumed) | 0.35 |
| Water | 4.94 |
| Dimethyl ether | 45.00 |
| Total | 100.00 (23.80) |

Example 10

| Ingredient | % w/w |
|---|---|
| Worleesol E330W | 38.00 (15.96) |
| Defoamer | 0.20 (0.02) |
| Thickener | 0.23 |
| Flow/slip additive | 0.08 |
| Water | 13.49 |
| Dimethyl ether | 48.00 |
| Total | 100.00 (16.29) |

Example 11

| Ingredient | amount/w-% |
|---|---|
| Polyurethane-modified alkyd resin | 23.15 (11.58) |
| Flow promoter (Capston) | 0.15 |

-continued

| Ingredient | amount/w-% |
|---|---|
| Pigment stabilizer (Dextrol) | 0.23 |
| Thickener (Rheolate) | 0.46 |
| Drying agent (Additol) | 0.85 (0.05) |
| Drying accelerator | 0.54 |
| Monoethanolamine (corrosion inhibitor) | 0.15 |
| Color pigment | 7.00 (5.00) |
| Water | 24.28 |
| DME (dimethyl ether) | 44.00 |
| Total | 100.0 (18.16) |

Example 12

Comparison and Combability Tests

12a) Comparison Test for Ageing of an Aerosol Paint Composition

General

The spray pattern delivered from an aerosol can is a combination of the content of the can proportions, being the amount of liquefied propellant, the pressure, viscosity and of course how fine are the solid particles that have to be trans-ported through the valve and the actuator.

As an indication the diameter of the openings in the valve and actuator during the spraying are between 0.1 mm to 0.5 mm.

This means if paint in the can starts to flocculate or is the binder gets attacked by the propellant (DME) and cloaks together this will have a direct impact on the spray result. This can lead to solid particles disturbing the wet film and being visible in the dry film until totally blocking of the valve and actuator.

Aging tests have been done with the formulations 1-3.

Formulation 1

Colored Top Coat Based on Mix of Polyurethane Modified Short and Medium Oil Alkyd Emulsion

| Ingredient | amount/w-% |
|---|---|
| Resin 1 Worleesol E927W | 25.00 10) |
| Resin 2 Domalkyd 0545 40 Wa or Necowel 586 N | 30.00 (12) |
| dispersing agent Byk 191 | 0.25 |
| defoamer Byk 015 | 0.20 |
| flow/slip additive tego glide 110 | 0.18 |
| thickener (Tixothrope) Tafigel pur 60 | 0.10 |
| thickener (Tixothrope) Byk 525 | 0.16 |
| color paste mixture | 10.00 (7) |
| water | 11.11 |
| Dimethyl ether | 12.00 |
| Total | 100.00 (29.89) |

Formulation 3I: Acrylic Dispersion Based Colored Top Coat

| Ingredient | % w/w |
|---|---|
| EPS 294 (405 w/w in water) | 35.00 (14) |
| thickener Rheolate 310 | 0.40 |
| Tego glide 110 | 0.30 |
| Bentone SD2 | 0.13 |
| Color pastes | 8.00 (5.6) |
| Texanol (solvent no VOC) | |

-continued

| Ingredient | % w/w |
|---|---|
| 3-pentanediol,2,2,4-trimethyl-monoisobutyrate) | 4.00 |
| water | 17.17 |
| Dimethyl ether (DME) | 35.00 |
| Total | 100.00 (24.43) |

Formulation 3I
Clear Acrylic Varnish:

| Ingredient | % w/w |
|---|---|
| Joncryl 538 (acrylic dispersion) | 32.40 (15.07) |
| Joncryl 683 (low mol weight acryl 98% in solvent) | 9.00 (8.82) |
| diethyleneglycol monobutylether (non-flammable but it will burn. UEL 6.2 LEL 0.9% in air) | 4.00 |
| Isopropanol | 3.00 |
| Defoamer byk 015 | 0.30 |
| Acemat 520 (hydrophobic fumed silica) | 0.40 |
| Thickener DSX 3290 | 0.55 |
| water | 10.35 |
| Dimethyl ether | 40.00 |
| Total | 100.00 (24.99) |

Results

After aging tests in the oven at 40° C. and 20° C. with intervals of 1 week spray tests have been performed.

12b) Compatibility Test Method Between Propellant and Binder

Test method to determine compatibility between water-based binders and liquified propellants.

Compatibility tests have been also done with the formulations 1-3 (see below).

Description and purpose of the test.

Testing compatibility of water-based binders with hydrocarbon propellant, specifically dimethyl ether (DME) in various mix ratio's together with the amount co-solvent if needed for the film forming of the binder. Binder and propellant were both as homogenous solutions and these solutions were then mixed together. In tests it is given the weights binder dispersion/emulsion and liquid propellant (wet/wet).

Binder dispersions and emulsions can be disturbed by adding hydrocarbon or more generally organic liquids like dimethyl ether DME (DME is at least partly liquid in an aerosol can).

Cause can be disturbance of the binder emulsion or dispersion that can lead to and agglomerate of binder with a particle size too big the be handled by the aerosol valve and will lead to a blocked and non-functional product.

By disturbing the emulsion and/or dispersion the protection of the binder particles will be less and the can be attacked by the liquid DME that can result in tackifying of the particles which will lead to agglomerates with the above-mentioned blocking effect of the aerosol valve. These agglomerates of binder will also disturb film forming process. In a case size of the binder particles (agglomerates) are 35-40 um they can be visually inspected.

To test the compatibility of the binders and the DME, aerosol fillings comprising paint material composition made of DME, binders, possible co-solvents and water is made in various concentrations, preferably in glass aerosol cans to observe the behaviour of the mixtures under pressure. If no glass aerosol cans are available normal metal aerosol cans can be used also.

Test Criteria:

Functionality of the spray can or bottle meaning smooth spray pattern; no blocking of actuator valve etc.

In case of use glass aerosols; observe irregularities in the mixture in the pack-age.

Spraying of the paint coating material onto target surface/site and detecting film forming properties:

Film forming: a smooth paint film should be formed without any visible binder parts that do not contribute to film forming process. Any binder particle should be below 35-40 μm.

Transparency or discoloration of the formed paint film and gloss of the paint film should be right.

Paint film gloss should be over 80 when determined according to ISO 2813 or transparency, (clarity, haziness) of the film should be under 4-5 when determined as iodine colour number. This can be done according to standard DIN EN 1557 and DIN 6162. If transparency of paint film or paint material composition inside the aerosol can is inspected visually saybolt-colour scale (ASTM D 156) can be used.

Iodine value can be determined by various methods (see for example Wikipedia: methods for determination of iodine value).

Instead of Iodine colour number also Gardner color scale can be used (ASTM standard D1544 and D6045).

Drying time of the film is appropriate. This test criteria is somewhat subjective and should be applied with care because a proper paint film quality is most important aspect.

Combability Tests: Results

| | | | Test 1 | | | | | | | | | | | | | |
|---|---|---|---|---|---|---|---|---|---|---|---|---|---|---|---|---|
| | | | Binder: Joncryl 538 together with co-solvent inside criteria | | | | | | | | | | | | | |
| Binder | Co-solv. | DME | 0 | 1 | 2 | 3 | 4 | 5 | 6 | 7 | 8 | 9 | 10 | 11 | 12 | 13 |
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | +/− | +/− | +/− | +/− | +/− | +/− | +/− | +/− | − | − | − | − |
| 40 | 1.2 | 58.8 | + | + | +/− | +/− | +/− | +/− | +/− | +/− | +/− | +/− | − | − | − | − |
| 45 | 1.35 | 53.65 | + | + | +/− | +/− | +/− | +/− | +/− | +/− | +/− | +/− | − | − | − | − |
| 50 | 1.5 | 48.5 | + | + | + | + | + | + | + | + | + | + | + | +/− | +/− | +/− |
| 55 | 1.65 | 43.35 | + | + | + | + | + | + | + | + | + | + | + | +/− | +/− | +/− |
| 60 | 1.8 | 38.35 | + | + | + | + | + | + | + | + | + | + | + | +/− | +/− | +/− |
| 65 | 1.95 | 33.05 | + | + | + | + | + | + | + | + | + | + | + | + | + | +/− |
| 70 | 2.1 | 27.9 | + | + | + | + | + | + | + | + | + | + | + | + | + | +/− |

-continued

| Test 1 | | | | | | | | | | | | | | | | |
|---|---|---|---|---|---|---|---|---|---|---|---|---|---|---|---|---|
| 75 | 2.25 | 22.75 | + | + | + | + | + | + | + | + | + | + | + | + | + | +/− | inside  + ok
 +/−  Particle size is growing
 −  Particles form sediment on the bottom Binder: Joncryl 538 together with co-solvent Spray Pattern
criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | +/− | +/− | +/− | +/− | +/− | +/− | +/− | +/− | − | − | − | − |
| 40 | 1.2 | 58.8 | + | + | +/− | +/− | +/− | +/− | +/− | +/− | +/− | +/− | − | − | − | − |
| 45 | 1.35 | 53.65 | + | + | +/− | +/− | +/− | +/− | +/− | +/− | +/− | +/− | − | − | − | − |
| 50 | 1.5 | 48.5 | + | + | + | + | + | + | + | + | + | + | + | +/− | +/− | +/− |
| 55 | 1.65 | 43.35 | + | + | + | + | + | + | + | + | + | + | + | +/− | +/− | +/− |
| 60 | 1.8 | 38.35 | + | + | + | + | + | + | + | + | + | + | + | +/− | +/− | +/− |
| 65 | 1.95 | 33.05 | + | + | + | + | + | + | + | + | + | + | + | + | + | +/− |
| 70 | 2.1 | 27.9 | + | + | + | + | + | + | + | + | + | + | + | + | + | +/− |
| 75 | 2.25 | 22.75 | + | + | + | + | + | + | + | + | + | + | + | + | + | +/− | spray  + Spray ok
 +/−  Spray pattern interrupted by to big solid particles
 −  Actuator/valve blocked gloss
criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | +/− | +/− | +/− | +/− | +/− | +/− | +/− | +/− | − | − | − | − |
| 40 | 1.2 | 58.8 | + | + | +/− | +/− | +/− | +/− | +/− | +/− | +/− | +/− | − | − | − | − |
| 45 | 1.35 | 53.65 | + | + | +/− | +/− | +/− | +/− | +/− | +/− | +/− | +/− | − | − | − | − |
| 50 | 1.5 | 48.5 | + | + | + | + | + | + | + | +/− | +/− | +/− | +/− | +/− | +/− | +/− |
| 55 | 1.65 | 43.35 | + | + | + | + | + | + | + | + | + | +/− | +/− | +/− | +/− | +/− |
| 60 | 1.8 | 38.35 | + | + | + | + | + | + | + | + | + | + | +/− | +/− | +/− | +/− |
| 65 | 1.95 | 33.05 | + | + | + | + | + | + | + | + | + | + | + | + | +/− | +/− |
| 70 | 2.1 | 27.9 | + | + | + | + | + | + | + | + | + | + | + | + | + | +/− |
| 75 | 2.25 | 22.75 | + | + | + | + | + | + | + | + | + | + | + | + | + | +/− |

Gloss 60°  +++ 80-100
 ++ 60-80
 + 40-60
 − <40

| Test 2 | | | | | | | | | | | | | | | | |
|---|---|---|---|---|---|---|---|---|---|---|---|---|---|---|---|---|
| Binder: Synthalat PWM 8839 together with co-solvent | | | | | | | | | | | | | | | | |
| inside | | | | | | | | | | | | | | | | |
| criteria | | | | | | | | | | | | | | | | |

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | + | + | +/− | +/− | +/− | +/− | +/− | +/− | − | − | − | − |
| 40 | 1.2 | 58.8 | + | + | + | + | +/− | +/− | +/− | +/− | +/− | +/− | − | − | − | − |
| 45 | 1.35 | 53.65 | + | + | + | + | +/− | +/− | +/− | +/− | +/− | +/− | − | − | − | − |
| 50 | 1.5 | 48.5 | + | + | + | + | + | + | + | + | + | + | +/− | +/− | +/− | |
| 55 | 1.65 | 43.35 | + | + | + | + | + | + | + | + | + | + | +/− | +/− | +/− | |
| 60 | 1.8 | 38.35 | + | + | + | + | + | + | + | + | + | + | +/− | +/− | +/− | |
| 65 | 1.95 | 33.05 | + | + | + | + | + | + | + | + | + | + | + | + | +/− | |
| 70 | 2.1 | 27.9 | + | + | + | + | + | + | + | + | + | + | + | + | +/− | |
| 75 | 2.25 | 22.75 | + | + | + | + | + | + | + | + | + | + | + | + | +/− | |

-continued

| | | | | | | | | | Test 2 | | | | | | | |
|---|---|---|---|---|---|---|---|---|---|---|---|---|---|---|---|---| inside    +    ok
         +/−  Particle size is growing
         −    Particles form sediment on the bottom Binder: Joncryl 538 together with co-solvent Spray Pattern criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | + | +/− | +/− | +/− | +/− | +/− | +/− | +/− | − | − | − | − |
| 40 | 1.2 | 58.8 | + | + | + | + | +/− | +/− | +/− | +/− | +/− | +/− | − | − | − | − |
| 45 | 1.35 | 53.65 | + | + | + | + | + | + | +/− | +/− | +/− | +/− | − | − | − | − |
| 50 | 1.5 | 48.5 | + | + | + | + | + | + | + | + | + | + | + | +/− | +/− | +/− |
| 55 | 1.65 | 43.35 | + | + | + | + | + | + | + | + | + | + | + | +/− | +/− | +/− |
| 60 | 1.8 | 38.35 | + | + | + | + | + | + | + | + | + | + | + | +/− | +/− | +/− |
| 65 | 1.95 | 33.05 | + | + | + | + | + | + | + | + | + | + | + | + | + | +/− |
| 70 | 2.1 | 27.9 | + | + | + | + | + | + | + | + | + | + | + | + | + | +/− |
| 75 | 2.25 | 22.75 | + | + | + | + | + | + | + | + | + | + | + | + | + | +/− | spray    +    Spray ok
        +/−  Spray pattern interrupted by to big solid particles
        −    Actuator/valve blocked gloss criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | + | + | +/− | +/− | +/− | +/− | +/− | +/− | +/− | +/− | − | − | − | − |
| 30 | 0.9 | 69.1 | + | + | +/− | +/− | +/− | +/− | +/− | +/− | +/− | +/− | − | − | − | − |
| 35 | 1.05 | 63.95 | + | + | + | +/− | +/− | +/− | +/− | +/− | +/− | +/− | − | − | − | − |
| 40 | 1.2 | 58.8 | + | + | + | +/− | +/− | +/− | +/− | +/− | +/− | +/− | − | − | − | − |
| 45 | 1.35 | 53.65 | + | + | + | + | + | +/− | +/− | +/− | +/− | +/− | − | − | − | − |
| 50 | 1.5 | 48.5 | + | + | + | + | + | + | + | +/− | +/− | +/− | +/− | +/− | +/− | +/− |
| 55 | 1.65 | 43.35 | + | + | + | + | + | + | + | + | + | + | +/− | +/− | +/− | +/− |
| 60 | 1.8 | 38.35 | + | + | + | + | + | + | + | + | + | + | +/− | +/− | +/− | +/− |
| 65 | 1.95 | 33.05 | + | + | + | + | + | + | + | + | + | + | + | + | +/− | +/− |
| 70 | 2.1 | 27.9 | + | + | + | + | + | + | + | + | + | + | + | + | + | +/− |
| 75 | 2.25 | 22.75 | + | + | + | + | + | + | + | + | + | + | + | + | + | +/− |

Gloss ⌊60°   +++  80-100
             ++   60-80
             +    40-60
             −    <40

Test 3

Binder: Synthalat PMW together with co-solvent inside criteria

| Binder | Co-solv. | Dme | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | − | Test stopped | | | | | | | | | | | | |
| 30 | 0.9 | 69.1 | − | Test stopped | | | | | | | | | | | | |
| 35 | 1.05 | 63.95 | − | Test stopped | | | | | | | | | | | | |
| 40 | 1.2 | 58.8 | − | Test stopped | | | | | | | | | | | | |
| 45 | 1.35 | 53.65 | − | Test stopped | | | | | | | | | | | | |
| 50 | 1.5 | 48.5 | − | Test stopped | | | | | | | | | | | | |
| 55 | 1.65 | 43.35 | − | Test stopped | | | | | | | | | | | | |
| 60 | 1.8 | 38.35 | − | Test stopped | | | | | | | | | | | | |
| 65 | 1.95 | 33.05 | − | Test stopped | | | | | | | | | | | | |
| 70 | 2.1 | 27.9 | + | + | +/− | +/− | +/− | +/− | +/− | Test stopped | | | | | | |
| 75 | 2.25 | 22.75 | + | + | +/− | +/− | +/− | +/− | +/− | + | Test stopped | | | | | |

-continued

Test 3

| | | | | | | | | | | | | | | | | |
|---|---|---|---|---|---|---|---|---|---|---|---|---|---|---|---|---|
| inside | + | ok | | | | | | | | | | | | | | |
| | +/− | Particle size is growing | | | | | | | | | | | | | | |
| | − | Particles form sediment on the bottom | | | | | | | | | | | | | | |

Binder: Joncryl 538 together with co-solvent

Spray Pattern criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | − | Test stopped | | | | | | | | | | | | |
| 30 | 0.9 | 69.1 | − | Test stopped | | | | | | | | | | | | |
| 35 | 1.05 | 63.95 | − | Test stopped | | | | | | | | | | | | |
| 40 | 1.2 | 58.8 | − | Test stopped | | | | | | | | | | | | |
| 45 | 1.35 | 53.65 | − | Test stopped | | | | | | | | | | | | |
| 50 | 1.5 | 48.5 | − | Test stopped | | | | | | | | | | | | |
| 55 | 1.65 | 43.35 | − | Test stopped | | | | | | | | | | | | |
| 60 | 1.8 | 38.35 | − | Test stopped | | | | | | | | | | | | |
| 65 | 1.95 | 33.05 | − | Test stopped | | | | | | | | | | | | |
| 70 | 2.1 | 27.9 | + | + | +/− | +/− | +/− | +/− | +/− | Test stopped | | | | | | |
| 75 | 2.25 | 22.75 | + | + | +/− | +/− | +/− | +/− | +/− | + | Test stopped | | | | | |

| | | |
|---|---|---|
| spray | + | Spray ok |
| | +/− | Spray pattern interrupted by to big solid particles |
| | − | Actuator/valve blocked | gloss criteria

| Binder | Co-solv. | DME | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| 25 | 0.75 | 74.25 | --- | Test stopped | | | | | | | | | | | | |
| 30 | 0.9 | 69.1 | --- | Test stopped | | | | | | | | | | | | |
| 35 | 1.05 | 63.95 | --- | Test stopped | | | | | | | | | | | | |
| 40 | 1.2 | 58.8 | --- | Test stopped | | | | | | | | | | | | |
| 45 | 1.35 | 53.65 | --- | Test stopped | | | | | | | | | | | | |
| 50 | 1.5 | 48.5 | --- | Test stopped | | | | | | | | | | | | |
| 55 | 1.65 | 43.35 | --- | Test stopped | | | | | | | | | | | | |
| 60 | 1.8 | 38.35 | --- | Test stopped | | | | | | | | | | | | |
| 65 | 1.95 | 33.05 | --- | Test stopped | | | | | | | | | | | | |
| 70 | 2.1 | 27.9 | +/− | +/− | − | Test stopped | | | | | | | | | | |
| 75 | 2.25 | 22.75 | +/− | +/− | − | Test stopped | | | | | | | | | | |

| gloss ⌊60° | +++ | 80-100 |
|---|---|---|
| | ++ | 60-80 |
| | + | 40-60 |
| | − | <40 |

CONCLUSIONS

Formulation 1
  1 week high gloss good opacity no spray defects. Eventually this formulation has a shelf life of app 3 years at 20° C.

Formulation 2
  1 week a little lower gloss than fresh can at start of the test. opacity ok
  2 weeks solid particles in the spray interrupting the spray pattern and visible in the wet and dry film.
  3 weeks after vigorously shaking the shaking balls were free a pray attempt was made but the valve/actuator system was blocked completely. After degassing the can (uncultured with a pin) the paint in the can was observed. It showed total coagulated binder and color pigment.
  Conclusion: not stable, short shelf life.

Formulation 3
  Immediately (timeframe appr. 1 h) after making the can it was impossible to spray for the moment the actuator was pushed down the valve and the actuator blocked completely.
  After degassing the can (uncultured with a pin) the paint in the can was observed. It showed total coagulated binder and color pigment.

Conclusion: Nor stable, very short shelf life

Conclusions: Acrylic dispersions (formula 1 and 2) of water-borne aerosol paint do not have enough shelf life, because these acrylic resins are incompatible with propellant dimethyl ether (DME). When alkyd polyurethane modified short and medium oil alkyd emulsion were used as resin enough shelf life was achieved.

The invention claimed is:

1. A method for preparing a water based aerosol paint composition having a high concentration of coating material by selecting at least one pair of a polymeric resin and a propellant so that the at least one pair of the polymeric resin and the propellant will pass a mutual compatibility test, and after ensuring that the at least one pair of the polymeric resin and the propellant pass the mutual compatibility test, preparing a water based aerosol paint composition from the at least one pair of the polymeric resin and the propellant, the method comprising:
  selecting the at least one pair of the polymeric resin and the propellant, wherein the polymeric resin is selected among the groups A1-A9:
  A1) a saponified/neutralized short oil alkyd which is dilutable/emuisifiable in a water-based solvent and comprises less than 40% w/w fatty acids, A2) a saponified/neutralized medium oil alkyd which is dilutable/emulsifiable in a water-based solvent and comprises 40-60% w/w fatty acids, A3) a short oil alkyd which is emulsified/dispersed in a water-based solvent and comprises less than 40% w/w fatty acids, A4) a medium oil alkyd which is emulsified/dispersed in a water-based solvent and comprises 40-60% w/w fatty acids, A5) a medium oil polyurethane modified alkyd resin emulsified/dispersed in a water-based solvent and comprising 40-60% w/w fatty acids, A6) a short oil polyurethane modified alkyd resin emulsified/dispersed in a water-based solvent and comprising less than 40% w/w fatty acids, A7) an acrylic resin dispersible or emulsifiable in a water based solvent, A8) a polyurethane modified acrylic resin dispersible or emulsifiable in a water based solvent, A9) a polyurethane resin, and wherein the propellant is selected among the groups B1-B3

B1) dimethyl ether (DME),

B2) propane, butane, isobutane, and mixtures thereof,

B3); 2,2-dichloro-1,1,1-trifluoroethane;

performing the mutual compatibility test of the at least one pair of the polymeric resin and the propellant in a pressurized vessel in the presence of water-based solvent, wherein the mutual compatibility test comprises evaluating compatibility of the propellant and the polymeric resin for a group of concentration pairs, wherein each concentration pair comprises a first concentration of the polymeric resin which belongs to a group of polymeric resin concentrations and a second concentration of the propellant which belongs to a group of propellant concentrations, wherein the group of polymeric resin concentrations comprises a range of polymeric concentrations which covers a test concentration range of polymeric resin, and wherein the group of propellant concentrations comprises a range of propellant concentrations which covers a test concentration range of propellant; and wherein for the group of concentration pairs, the compatibility of the propellant and the polymeric resin is evaluated using test criteria C1-C3 which take into account at least the following:

C1) disturbances in paint film formation: low gloss and transparency, abnormal formation of particles inside the paint film;

C2) disturbances in spraying pattern (obstruction of a valve of an aerosol can) of paint material when sprayed out of the aerosol can;

C3) disturbances in gloss or transparency of paint material when stored a time period inside the aerosol can;

wherein for the test criteria C1-C3, failed compatibility (non-compatibility) of the propellant and the polymeric resin is indicated by the following:

C1: disturbance in film forming properties of a paint material sprayed from an aerosol can onto a target site, wherein disturbance is defined as a gloss under 80, defined according to ISO 2813, and as a transparency over 5, when defined as an iodine colour number according to standard DIN EN 1557 or DIN 6162, C2: disturbance in spraying properties of an aerosol paint composition, detected as an aerosol can valve jamming due to paint material particles, C3: disturbance in gloss or transparency of an aerosol paint composition when stored for an extended time period in an aerosol can, wherein disturbance is defined as a gloss under 80, defined according to ISO 2813, and a transparency over 5, when defined as an iodine colour number according to standard DIN EN 1557 or DIN 6162, and after ensuring that the at least one pair of the polymeric resin and the propellant pass the mutual compatibility test as indicated by test criteria C1-C3: providing into an aerosol can A) 50-85% w/w of coating material, consisting of non-volatile content in the range of 17-60% w/w, and volatile content in the range of 40-83% w/w, wherein the volatile content comprises water or mixture of water with a water compatible co-solvent and wherein the nonvolatile content comprises the polymeric resin in the range of 35-90% w/w, color pigments, dispersing agents and possible fillers in the range of totally 0-30% w/w and additives up to 9% w/w, provided that the polymeric resin makes up at least 8% w/w (dry weight at least 6% w/w) of the total weight of the water based aerosol paint composition, and B) 15-50% w/w of the propellant; and sealing the aerosol can.

2. The method according to claim 1, wherein propellant is dimethyl ether (DME).

3. The method according to claim 1, wherein polymeric resin is selected among the groups A1-A6:

A1) a saponified/neutralized short oil alkyd which is dilutable/emulsifiable in a water-based solvent and comprises less than 40% w/w fatty acids, A2) a saponified/neutralized medium oil alkyd which is dilutable/emulsifiable in a water-based solvent and comprises 40-60% w/w fatty acids, A3) a short oil alkyd which is emulsified/dispersed in a water-based solvent and comprises less than 40% w/w fatty acids, A4) a medium oil alkyd which is emulsified/dispersed in a water-based solvent and comprises 40-60% w/w fatty acids, A5) a medium oil polyurethane modified alkyd resin emulsified/dispersed in a water-based solvent and comprising 40-60% w/w fatty acids, A6) a short oil polyurethane modified alkyd resin emulsified/dispersed in a water-based solvent and comprising less than 40% w/w fatty acids.

4. The method defined in claim 1, wherein the water-based solvent is either a) water without a co-solvent or b) a mixture of water and a water-compatible co-solvent, wherein the water-compatible co-solvent is present in a range of 0.1-4% w/w based on the total weight of the aerosol paint composition.

5. The method defined in claim 4, wherein a mixture of water and water-compatible co-solvent said co-solvent is one or more solvents selected from the group consisting of lower alcohols, glycol ethers, alkyl ethers of ethylene glycol or propylene glycol, wherein the total concentration of said co-solvents is in the range of 0.1-4% w/w calculated from the total weight of the aerosol paint composition.

6. The method defined in claim 1, wherein the water-based aerosol paint resin to be prepared have passed the mutual compatibility test of the propellant and the polymeric resin, within the tested concentration range of polymeric resin and propellant group and have a shelf life of several months.

7. The method defined in claim 1, for preparing a water based aerosol paint composition, wherein either styrene, styrene-butadiene or latex resins are excluded.

8. The method defined in claim 1, for preparing a water based aerosol paint composition, wherein Tg (glass transition state) of the polymeric resin is over 55 and/or MTF (minimum film formation temperature) of the polymeric resin is under 20° C.

9. The method defined in claim 1, which method comprises in stages A and B: filling the aerosol can with the coating material, filling the aerosol can with the propellant, wherein the propellant is dimethyl ether (DME), and sealing the aerosol can.

10. The method defined in claim 1, wherein the aerosol can has a filling volume of either 400 ml or 675 ml.

11. The method defined in claim 1, wherein the test concentration range of the polymeric resin is from 10% w/w to 90% w/w.

12. The method defined in claim 11, wherein the test concentration range of the polymeric resin is from 25% w/w to 75% w/w.

13. The method defined in claim 1, wherein the test concentration range of the propellant is from 10% w/w to 90% w/w.

14. The method defined in claim 13, wherein the test concentration range of the propellant is from 25% w/w to 75% w/w.

15. The method defined in claim 1, wherein the nonvolatile content is in the range of 30-50% w/w.

16. The method defined in claim 1, wherein the volatile content is in the range of 50-70% w/w.

17. The method defined in claim 4, wherein the water-compatible co-solvent is present in a range of 0.1-2% w/w based on the total weight of the aerosol paint composition.

18. A method for selecting a coating material and a propellant for use in preparing a water-based aerosol paint composition, the method comprising:
  selecting at least one pair of a polymeric resin and a propellant; and
  performing a mutual compatibility test using the at least one pair of the polymeric resin and the propellant in a pressurized vessel in the presence of water-based solvent;
  wherein the mutual compatibility test comprises evaluating compatibility of the propellant and the polymeric resin for a group of concentration pairs, wherein each concentration pair comprises a first concentration of the polymeric resin which belongs to a group of polymeric resin concentrations and a second concentration of the propellant which belongs to a group of propellant concentrations,
  wherein the group of polymeric resin concentrations comprises a range of polymeric concentrations which covers a test concentration range of polymeric resin, and
  wherein the group of propellant concentrations comprises a range of propellant concentrations which covers a test concentration range of propellant; and
  wherein for the group of concentration pairs, the compatibility of the propellant and the polymeric resin is evaluated using test criteria C1-C3 which take into account at least the following:

C1) disturbances in paint film formation: low gloss and transparency, abnormal formation of particles inside the paint film;

C2) disturbances in spraying pattern (obstruction of a valve of an aerosol can) of paint material when sprayed out of the aerosol can; and C3) disturbances in gloss or transparency of paint material when stored a time period inside the aerosol can;

wherein for the test criteria C1-C3, failed compatibility (non-compatibility) of the propellant and the polymeric resin is indicated by the following:

C1: disturbance in film forming properties of a paint material sprayed from an aerosol can onto a target site, wherein disturbance is defined as a gloss under 80, defined according to ISO 2813, and as a transparency over 5, when defined as an iodine colour number according to standard DIN EN 1557 or DIN 6162, C2: disturbance in spraying properties of an aerosol paint composition, detected as an aerosol can valve jamming due to paint material particles, and C3: disturbance in gloss or transparency of an aerosol paint composition when stored for an extended time period in an aerosol can, wherein disturbance is defined as a gloss under 80, defined according to ISO 2813, and a transparency over 5, when defined as an iodine colour number according to standard DIN EN 1557 or DIN 6162; and wherein successful completion of the mutual compatibility test indicates that the propellant and the polymeric resin are suitable for use in preparing a water-based aerosol paint composition.

19. A water-based aerosol paint composition comprising a pair of a polymeric resin and a propellant,
  wherein the polymeric resin is present at a first concentration in the water-based aerosol paint and the propellant is present at a second concentration in the water-based aerosol paint such that at the first concentration and the second concentration, the polymeric resin and the propellant pass a mutual compatibility test in a pressurized vessel in the presence of water-based solvent;
  wherein the mutual compatibility test comprises evaluating compatibility of the propellant and the polymeric resin at the first concentration and the second concentration using test criteria C1-C3 which take into account at least the following:

C1) disturbances in paint film formation: low gloss and transparency, abnormal formation of particles inside the paint film;

C2) disturbances in spraying pattern (obstruction of a valve of an aerosol can) of paint material when sprayed out of the aerosol can; and C3) disturbances in gloss or transparency of paint material when stored a time period inside the aerosol can;

wherein for the test criteria C1-C3, failed compatibility (non-compatibility) of the propellant and the polymeric resin is indicated by the following:

C1: disturbance in film forming properties of a paint material sprayed from an aerosol can onto a target site, wherein disturbance is defined as a gloss under 80, defined according to ISO 2813, and as a transparency over 5, when defined as an iodine colour number according to standard DIN EN 1557 or DIN 6162, C2: disturbance in spraying properties of an aerosol paint composition, detected as an aerosol can valve jamming due to paint material particles, and C3: disturbance in gloss or transparency of an aerosol paint composition when stored for an extended time period in an aerosol can, wherein disturbance is defined as a gloss under 80, defined according to ISO 2813, and a transparency over 5, when defined as an iodine colour number according to standard DIN EN 1557 or DIN 6162.

\* \* \* \* \*